United States Patent [19]
Dorn et al.

[11] Patent Number: 6,012,081
[45] Date of Patent: Jan. 4, 2000

[54] SERVICE AND EVENT SYNCHRONOUS/ASYNCHRONOUS MANAGER

[75] Inventors: Karlheinz Dorn, Kalchreuth; Detlef Becker, Moehrendorf; Dietrich Quehl, Erlangen, all of Germany

[73] Assignee: Siemens Aktiengesellschaft, Munich, Germany

[21] Appl. No.: 08/675,616

[22] Filed: Jul. 3, 1996

[51] Int. Cl.[7] .................................................. G06F 9/00
[52] U.S. Cl. ........................................ 709/102; 710/260
[58] Field of Search .................................... 395/671, 676, 395/683, 733, 704; 709/600, 106, 303; 710/260

[56] References Cited

U.S. PATENT DOCUMENTS

| | | |
|---|---|---|
| 4,853,843 | 8/1989 | Ecklund . |
| 5,019,963 | 5/1991 | Alderson et al. . |
| 5,043,871 | 8/1991 | Nishigaki et al. . |
| 5,047,918 | 9/1991 | Schwartz et al. . |
| 5,129,082 | 7/1992 | Tirfing et al. . |
| 5,151,987 | 9/1992 | Abraham et al. . |
| 5,161,223 | 11/1992 | Abraham . |
| 5,161,225 | 11/1992 | Abraham et al. . |
| 5,265,206 | 11/1993 | Shackelford et al. . |
| 5,313,629 | 5/1994 | Abraham et al. . |
| 5,367,633 | 11/1994 | Matheny et al. . |
| 5,430,850 | 7/1995 | Papdopoulos et al. .................. 395/683 |
| 5,437,027 | 7/1995 | Bannon et al. . |
| 5,499,365 | 3/1996 | Anderson et al. . |
| 5,515,538 | 5/1996 | Kleiman .................................... 395/733 |
| 5,692,193 | 11/1997 | Jagannathan et al. ................... 395/676 |
| 5,822,588 | 10/1998 | Sterling et al. .......................... 395/704 |
| 5,835,763 | 11/1998 | Klein ........................................ 395/671 |

OTHER PUBLICATIONS

E. J. Dijkstra, The Structure of "The" Multi programming System, Communications of the ACM, vol. 11, No. 5, May 1968, pp. 341–346.

C.A.R. Hoare, Monitors:Operating Systems Structuring Concepts, Communications of the, ACM, vol. 17, No. 10, Oct. 1974, pp. 549–557.

Beech, et al., Generalized Version Control in an Object–Oriented Database, Proceedings Fourth International Conference on Data Engineering, Feb. 1–5, 1988, Los Angeles, CA, p. 14–22.

Chou, et al., Versons and Change Notification in an Object–Oriented database System, 25th ACM/IEEE Design Automation Conference, Jun. 12–15, 1988, Anaheim, CA, pp. 275–281.

D. Heich, Generic Cmputer Aided Software Engineering (CASE) Database Requirements, IEEE 1989, pp. 422–423.

D.H. Fishman, An Overview of the IRIS Object–Oriented DBMS, Compcom Spring 1988, Thirty–Third IEEEComputer Society International Conference, Feb. 29–Mar. 3, San Francisco, CA, pp., 177–180.

*Primary Examiner*—Majid A. Banankhah
*Attorney, Agent, or Firm*—Hill & Simpson

[57] ABSTRACT

A service and event synchronous/asynchronous manager (SESAM) which provides a programmer interface to concurrency, dispatching and synchronization in an object oriented computing system. SESAM employs a high level framework which is operating system independent, uses threads for asynchrony and independence from operating systems which do not provide for asynchrony, supports a high level "wait-for-event" interface, provides portability of applications and provides synchronization of asynchronous functionality so as to support active object patterns as well as passive object patterns within a single homogenous solution. SESAM includes: (a) at least one dynamic slot providing asynchronous execution of user submitted function; (b) at least one asynchronous timer slot; (c) at least one asynchronous timer slot; (d) at least one exception slot for handling user defined system exception callbacks; (e) at least one slot providing external event notification for user events; (f) a SESAM dispatcher; (g) a pointer to a main operating system dispatcher; (h) a SESAM signaling dispatcher; (i) message block memory for storage of message blocks; (j) a list of SynchHandles that return an error external event notification for user events; and (k) an administrator for mapping of SynchHandles to slot identifiers.

12 Claims, 16 Drawing Sheets

SERVICE AND EVENT SYNCHRONOUS/ ASYNCHRONOUS MANAGER

BACKGROUND OF THE INVENTION

The present invention is directed to multi-programming systems on objected oriented platforms. More particularly, the invention is directed to threading control.

As set forth in U.S. Pat. No. 5,499,365, fully incorporated herein by reference, object oriented programming systems anld processes, also referred to as "object oriented computing environments," have been the subject of much investigation and interest. As is well known to those having skill in the art, object oriented programming systems are composed of a large number of "objects." An object is a data structure, also referred to as a "frame," and a set of operations or functions, also referred to as "methods," that can access that data structure. The frame may have "slots," each of which contains an "attribute" of the data in the slot. The attribute may be a primitive (such as an integer or string) or an object reference which is a pointer to another object. Objects having identical data structures and common behavior can be grouped together into, and collectively identified as a "class."

Each defined class of objects will usually be manifested in a number of "instances". Each instance contains the particular data structure for a particular example of the object. In an object oriented computing environment, the data is processed by requesting an object to perform one of its methods by sending the object a "message". The receiving object responds to the message by choosing the method that implements the message name, executing this method on the named instance, and returning control to the calling high level routine along with the results of the method. The relationships between classes, objects and instances traditionally have been established during "build time" or generation of the object oriented computing environment, i.e., prior to "run time" or execution of the object oriented computing environment.

In addition to the relationships between classes, objects and instances identified above, inheritance relationships also exist between two or more classes such that a first class may be considered a "parent" of a second class and the second class may be considered a "child" of the first class. In other words, the first class is an ancestor of the second class and the second class is a descendant of the first class, such that the second class (i.e., the descendant) is said to inherit from the first class (i.e., the ancestor). The data structure of the child class includes all or the attributes of the parent class.

Object oriented systems have heretofore recognized "versions" of objects. A version of an object is the same data as the object at a different point in time. For example, an object which relates to a "work in progress", is a separate version of the same object data which relates to a completed and approved work. Many applications also require historical records of data as it existed at various points in time. Thus, different versions of an object are required.

Two articles providing further general background are E. W. Dijkstra, The Structure of "THE " Multi programming System, Communications of the ACM, Vol. 11, No. 5, May 1968, pp. 341–346, and C.A.R. Hoare, Monitors: Operating Systems Structuring Concepts, Communications of the ACM, Vol. 17, No. 10, October, 1974, pp. 549–557, both of which are incorporated herein by reference. The earlier article describes methods for synchronizing using primitives and explains the use of semaphores while the latter article develops Brinch-Hansen's concept of a monitor as a method of structuring an operating system. In particular, the Hoare article introduces a form of synchronization for processes and describes a possible method of implementation in terms of semaphores and gives a proof rule as well as illustrative examples.

The following terms are or may be used herein:

Thread—a parallel execution unit within a process. A monitor synchronizes, by forced sequentialization, the parallel access of several simultaneously running threads, which all call up functions of one object that are protected through a monitor.

Synchronizations-Primitive—a means of the operating system for reciprocal justification of parallel activities.

Semaphore—a Synchronizations-Primitive for parallel activities.

Mutex—a special Synchronizations-Primitive for parallel activities, for mutual exclusion purposes, it includes a critical code range.

Condition Queue—an event waiting queue for parallel activities referring to a certain condition.

Gate Lock—a mutex of the monitor for each entry-function, for protection of an object by allowing only one parallel activity at a time to use an Entry-Routine of the object.

Long Term Scheduling—longtime delay of one parallel activity within a condition queue or event waiting queue for parallel activities.

Broker—a distributor.

The following acronyms also are or may be used herein:

| | |
|---|---|
| AFM | Asynchronous Function Manager |
| SESAM | Service & Event Synchronous Asynchronous Manager |
| PAL | Programmable Area Logic |
| API | Application Programmers Interface |
| IDL | Interface Definition Language |
| ATOMIC | Asynchron Transport Optimizing observer-pattern-like system supporting several Modes (client/server - push/pull) for an IDL-less Communication subsystem (This is the subject of commonly assigned application Serial No. 081676,859, Attorney Docket No. P960462 incorporated herein by reference) |
| XDR | External Data Representation |
| I/O | Input/Output |
| IPC | Inter Process Communication |
| CSA | Common Software Architecture (a Siemens AG computing system convention) |
| SW | Software |

SUMMARY OF THE INVENTION

The present invention provides a service and event synchronous/asynchronous manager (SESAM) which provides a programmer interface to concurrency, dispatching and synchronization in an object oriented computing system. The programmer thus is relieved from bothering with low level thread details. The interface serves as a gate to synchronous/asynchronous functions.

An object of SESAM is to provide a high level framework which is operating system independent.

An object of SESAM is to provide usage of threads for asynchrony and independence from operating systems which do not provide for asynchrony.

An object of SESAM is to provide support for a very high level "wait-for-event" interface which makes it possible for a single high level "applications-mainloop" to capture all low level operating system dependent event dispatching as well as high level application event dispatching.

An object of SESAM is to provide portability for applications and operating systems.

An object of SESAM is to provide synchronization of prior asynchronous functionality so as to support active object patterns as well as passive object patterns within a single homogenous solution.

In an embodiment, the invention provides an object oriented computing system programmer interface system, comprising:

(a) at least one dynamic slot providing asynchronous execution of programmer submitted functions;

(b) at least one synchronous timer slot;

(c) at least one asynchronous timer slot;

(d) at least one exception slot for handling programmer defined system exception callbacks;

(e) at least one slot providing external event notification for programmer events;

(f) a thread dispatcher;

(g) a main dispatcher;

(h) a signaling dispatcher;

(I) a thread manager for managing execution of threads;

(j) message block memory for storage of message blocks;

(k) a list of SynchHandles that return an error external event notification for user events;

(l) an administrator for mapping of SynchHandles to slot identifiers; and (m) a queue for blocked threads.

In an embodiment, the invention provides that a plurality of dynamic slots are provided, and the dynamic slots are configured to assume the following states:

an initial state when nonsignalled and not yet used;

a queued state when nonsignalled and in use;

a started state when nonsignalled and in use and a submitted function is being executed;

a finished state when signalled and in use and execution of a submitted function is complete;

a callback active (CbActive) state when signalled and in use and a submitted function is being executed; and an idle state when signalled and no longer in use.

In an embodiment, the invention provides that the main dispatcher is provided by way of a pointer to an operating system dispatcher.

In an embodiment, the invention provides an object oriented computing system programmer interface system, comprising:

means for centrally dispatching threads and providing runtime configurable delivery of event handlers;

means for interrupting execution of event handlers;

means for blocking waits for events in event handlers;

means for executing functions asynchronously with respect to events occurring external to the interface system; and means for executing asynchronous timer handlers in parallel to other running event handlers.

In an embodiment, the invention provides an object oriented computing system programmer interface system, comprising:

means for interrupting callback driven systems, including interrupting callbacks themselves;

an asynchronous dispatcher;

a synchronous dispatcher;

an asynchronous signaling dispatcher;

a thread manager; and a plurality of different types of slots used for administrating activities assigned to them.

In an embodiment, the invention provides that the plurality of different types of slots comprises:

at least one dynamic slot which administrates asynchrony for an application programmer;

at least one synchronous timer slots which administrates synchronous timers;

at least one asynchronous timer slot which administrates asynchronous timers;

at least one exception slot which administrates user defined system exception callbacks; and at least one generic slot which administrates waitFor . . . ( ) functionality for user events.

These and other features of the invention are discussed in greater detail below in the following detailed description of the presently preferred embodiments with reference to the accompanying drawings.

COPENDING APPLICATIONS

The following commonly assigned copending applications are incorporated herein by reference:

| Title | Application Serial No. | Filing Date | Attorney Docket No. |
|---|---|---|---|
| MONITOR SYSTEM FOR SYNCHRONIZATION OF THREADS WITHIN A SINGLE PROCESS | 081675,346 | 07/03/96 | P96,0460 |
| ASYNCHRONOUS TRANSPORT OPTIMIZING OBSERVER-PATTERN LIKE SYSTEM SUPPORTING SEVERAL MODES FOR AN INTERFACE DEFINITION LANGUAGE-LESS COMMUNICATION SUBSYSTEM | 081676,859 | 07/03/96 | P96,0462 |
| SOFTWARE ICS FOR HIGH LEVEL APPLICATION FRAME-WORKS | 081675,846 | 07/03/96 | P96,0463 |

DETAILED DESCRIPTION OF THE PRESENTLY PREFERRED EMBODIMENTS

Again, as set forth in U.S. Pat. No. 5,499,365, fully incorporated herein by reference, in an object oriented computing environment, work is accomplished by sending action request messages to an object which contains data. The object will perform a requested action on the data according to its predefined methods. Objects may be grouped into object classes which define the types and meanings of the data, and the action requests (messages), that the object will honor. The individual objects containing data are called instances of the class.

Object classes can be defined to be subclasses of other classes. Subclasses inherit all of the data characteristics and methods of the parent class. They can add additional data and methods and they can override or redefine any data elements or methods of the parent class.

Figure 1:
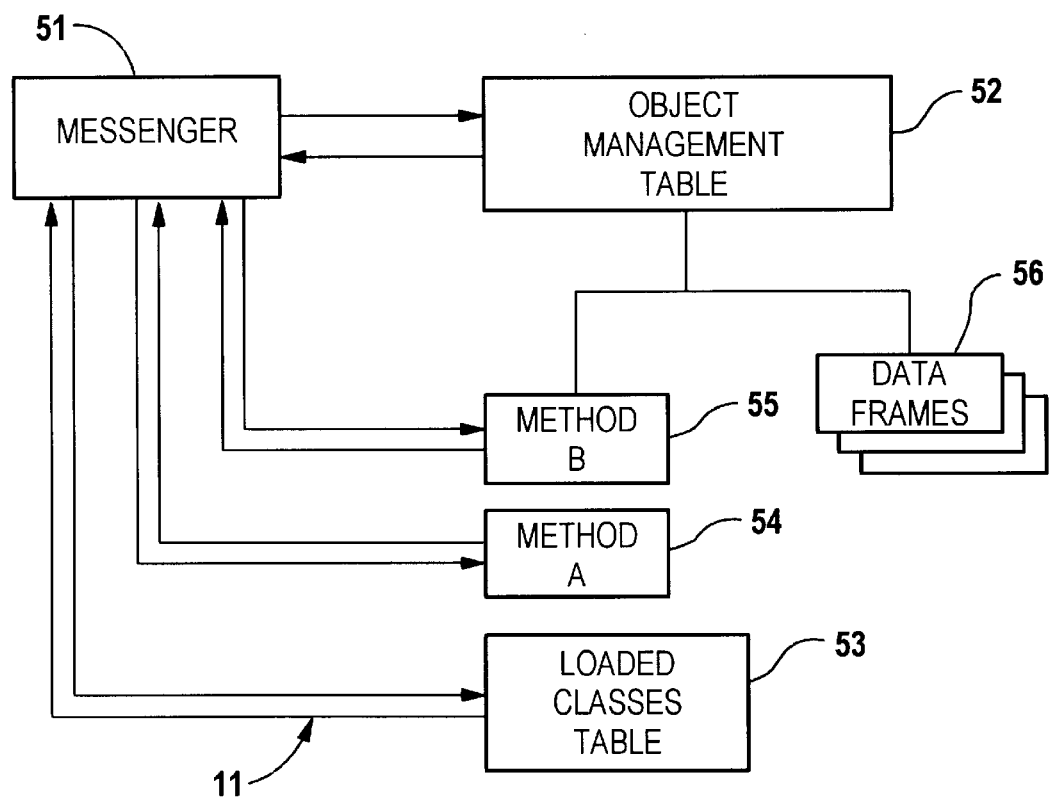
FIG. 1 illustrates a hardware and software environment.
Figure 2:
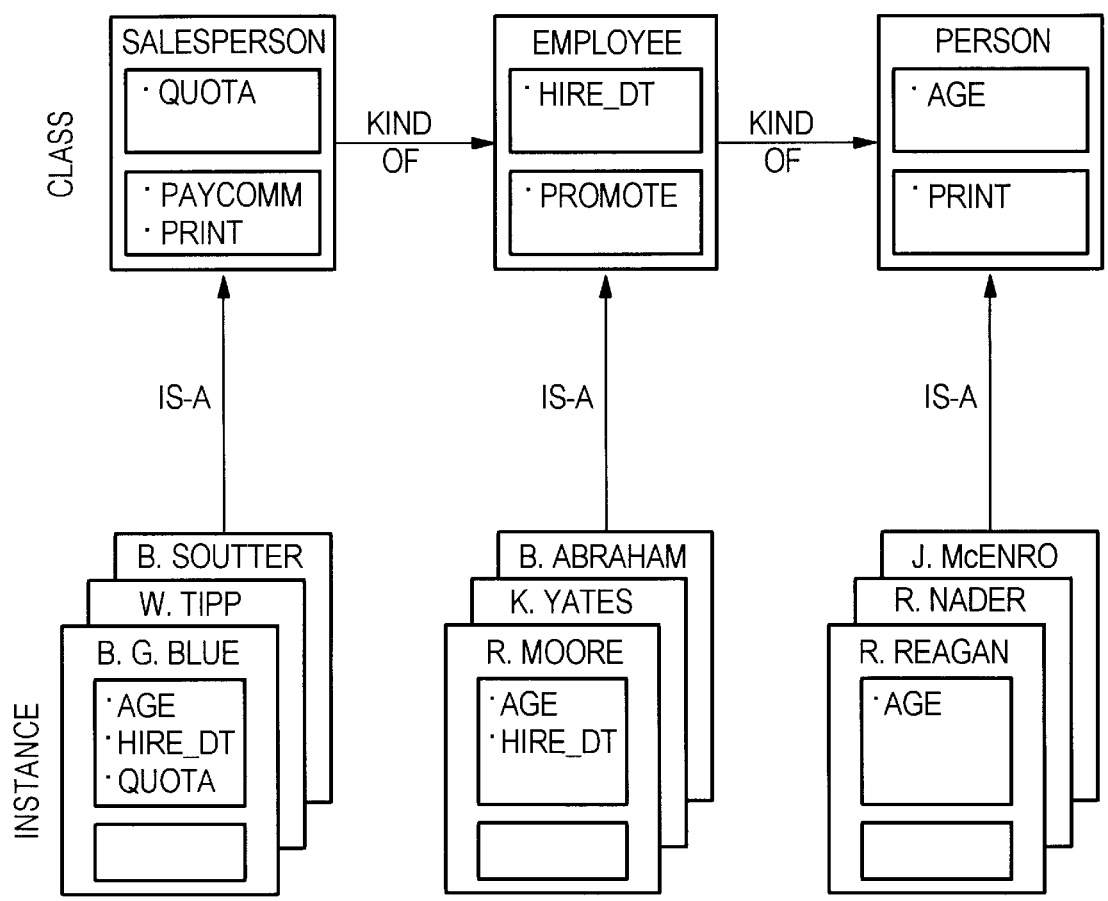
FIG. 2 illustrates the main components of an object-oriented program from FIG. 5 of U.S. Pat. No. 5,313,629.
Figure 3:
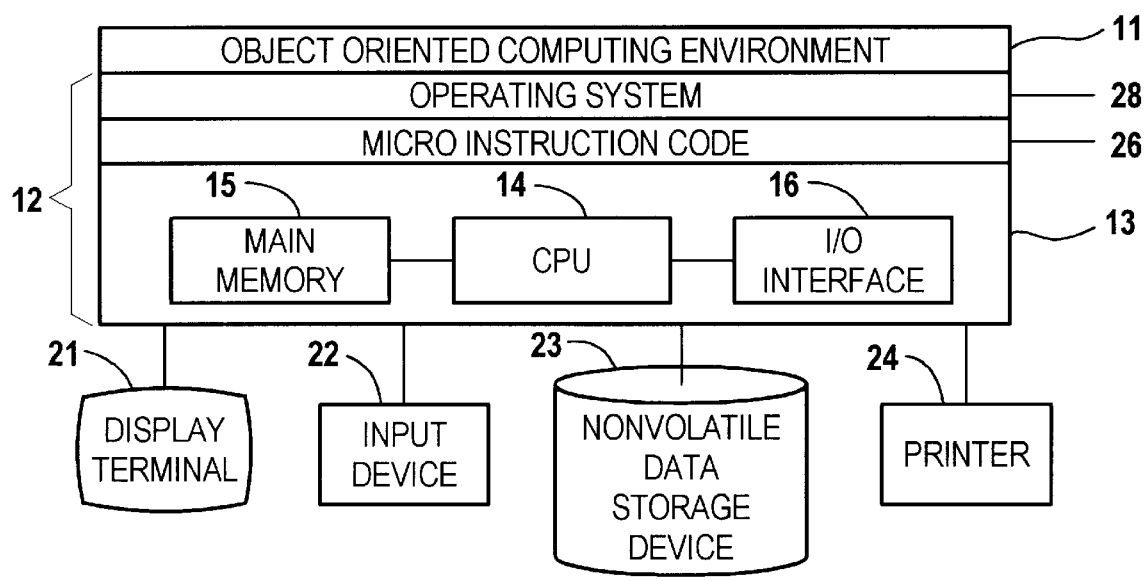
FIG. 3 illustrates an example of an inheritance hierarchy to an object oriented platform.

FIGS. 1, 2 and 3 are reproduced from U.S. Pat. No. 5,499,365. The following description relating thereto is derived from that patent.

Referring now to FIG. 1, a hardware and software environment is illustrated. In FIG. 1, there is shown an object oriented computing environment 11 operating on one or more computer platforms 12. It will be understood by those having skill in the art that computer platform 12 typically includes computer hardware units 13 such as a central processing unit (CPU) 14, a main memory 15 and an input/output (I/O) interface 16, and may include peripheral components such as a display terminal 21, an input device 22 such as a keyboard or a mouse, nonvolatile data storage devices 23 such as magnetic or optical disks, printers 24 and other peripheral devices. Computer platform 12 also typically includes microinstruction codes 26 and an operating system 128.

As shown in FIG. 1, object oriented computing environment 11 operates on computer platform 12. It will be understood by those having skill in the art that object oriented computing environment may operate across multiple computer platforms. Object oriented computing environment 11 is preferably written in the C++ computer programming language. The design and operation of computer platforms and object oriented computing environments including that of an object manager, are well known to those having skill in the art and are described, according to U.S. Pat. No. 5,499,365, in U.S. Pat. No. 5,265,206 issued Nov. 23, 1993 to Abraham, et al., entitled "A Messenger and Object Manager to Implement an Object Oriented Environment"; and U.S. Pat. No. 5,161,225 to Abraham, et al., entitled "Persistent Stream for Processing Time Consuming and Reusable Queries in an Object Oriented Database Management System; U.S. Pat. No. 5,151,987 to Abraham, et al., entitled "Recovery Objects in an Object Oriented Computing Environment"; and U.S. Pat. No. 5,161,223 ti Abraham, entitled "Resumeable Batch Query for Processing Time Consuming Queries in an Object Oriented Database Management System", all assigned to IBM, the disclosures of which are hereby incorporated herein by reference, and in numerous textbooks such as Object Oriented Software Construction by Bertrand Meyer, published by Prentice Hall in 1988, the disclosure of which is incorporated herein by reference, as are the publications referred to above in the Background of the Invention section of this specification.

Figure 5:
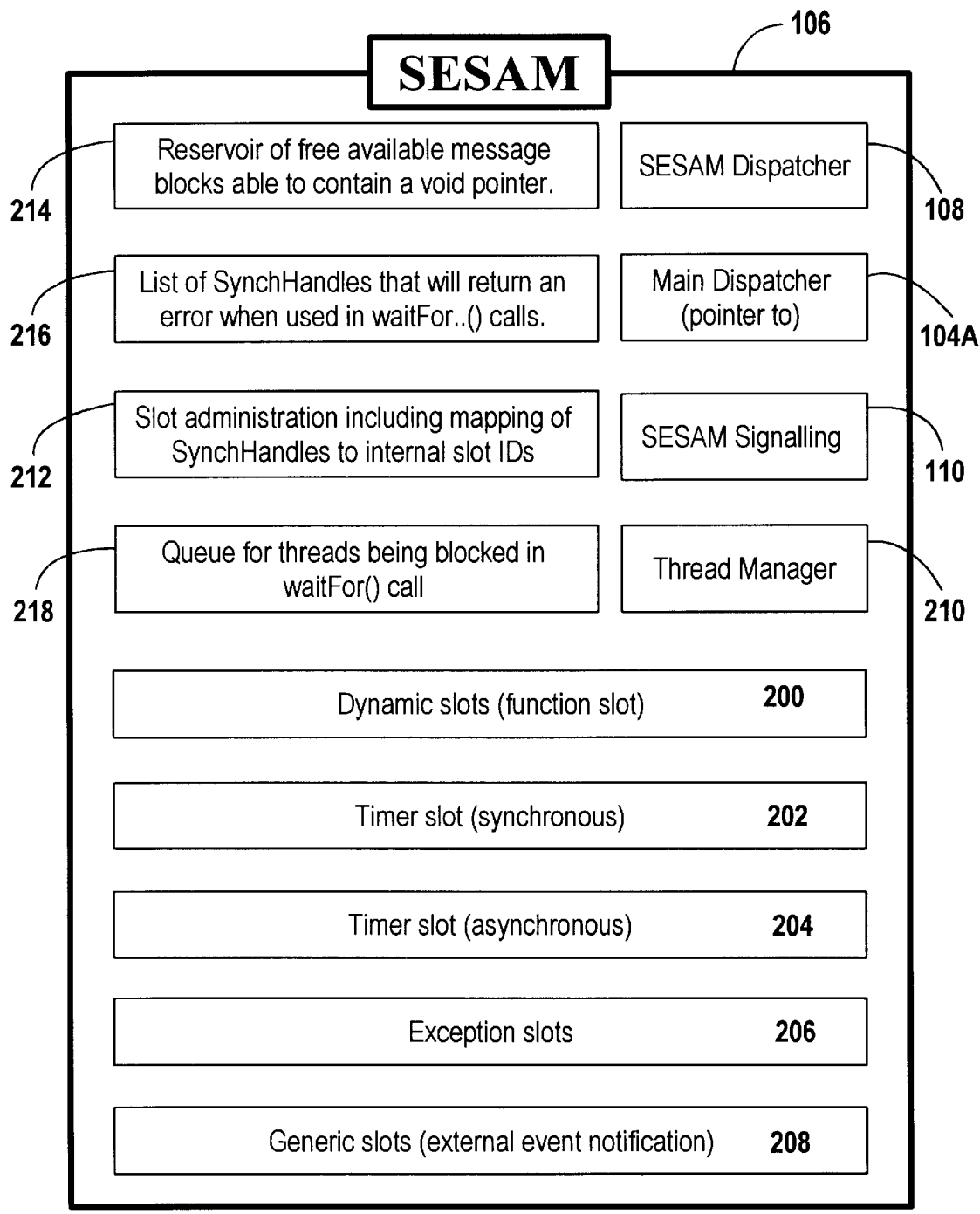
FIG. 5 illustrates basic components of SESAM.

Referring now to FIG. 2, which is a reproduction of FIG. 5 of U.S. Pat. No. 5,313,629, the main components of an object oriented program (11, FIG. 1) will be described. A detailed description of the design and operation of an object oriented program is provided in "Object Oriented Software Construction", by Bertrand Meyer, published by Prentice Hall in 1988, the disclosure of which is incorporated herein by reference.

Referring to FIG. 2, a typical object oriented computing environment 11 includes three primary components: a Messenger 51, and Object Management Table 52 and a Loaded Classes Table 53. The Messenger 51 controls communication between calling and called messages, Object Management Table 52 and Loaded Classes Table 53. Object Management Table 52 contains a list of pointers to all active object instances. The Loaded Classes Table 53 contains a list of pointers to all methods of active object classes.

Operation of the Object Oriented Program 11 will now be described for the example illustrated in FIG. 2, in which Methods A (block 54) of an object sends a message to method B (block 55) of an object. Method A sends a message to Method B by calling Messenger 51. The message contains (1) an object reference of the instance to receive the message, (2) the method the object instance is requested to perform on the data it encapsulates, and (3) any parameters needed by the receiving method. Messenger 51 obtains a pointer to the data frame 56 of the instance object specified by Method A, by searching Object Management Table 52 for the instance object. If the specified instance object cannot be found, Object Management Table 52 adds the instance object to the table and calls the instance to materialize its data from the database. Once in the instance table, Object Management Table 52 returns the pointer to the materialized instance object.

Messenger 51 then obtains the address of Method B from the Loaded Classes Table 53. If the instance's class is not loaded, the Loaded Classes Table 53 will load it at this time to materialize its data. The Loaded Classes Table 53 searches for the specified method (Method B) and returns the address of the method to Messenger 51.

The Messenger 51 then calls Method B, passing it a system data area and the parameters from the call made by Method A including the pointer. Method B accesses the data frame 56 using the pointer. Method B then returns control to the Messenger 51 which returns control to Method A.

FIG. 3 illustrates an example of an inheritance hierarchy to an object oriented computing platform. As shown, three object classes are illustrated for "salesperson", "employee" and "person", where a salesperson is a "kind of" employee, which is a "kind of" person. In other words, salesperson is a subclass of employee and employee is the superclass of salesperson. Similarly, employee is the subclass of person and person is the superclass of employee. Each class shown includes three instances. B. Soutter, W. Tipp and B. G. Blue are salespersons. B. Abraham, K. Yates and R. Moore are employees. J. McEnroe, R. Nader and R. Reagan are persons. In other words, an instance is related to its class by an "is a" relation.

Each subclass "inherits" the frames and methods of its superclass. Thus, for example, a salesperson frame inherits age and hire date objects from the employee's superclass as well as promote methods from the employee superclass. Salesperson also includes a unique quota attribute and a pay commission method. Each instance can access all methods and frames of its superclass, so that, for example, B. G. Blue can be promoted.

As set forth above, the invention, SESAM, is designed to offer to an application programmer an interface to concurrency, dispatching and synchronization, thus relieving the application programmer from bothering with low level thread details. In this way SESAM serves as a gate to synchronous and asynchronous function behavior.

Figure 4:
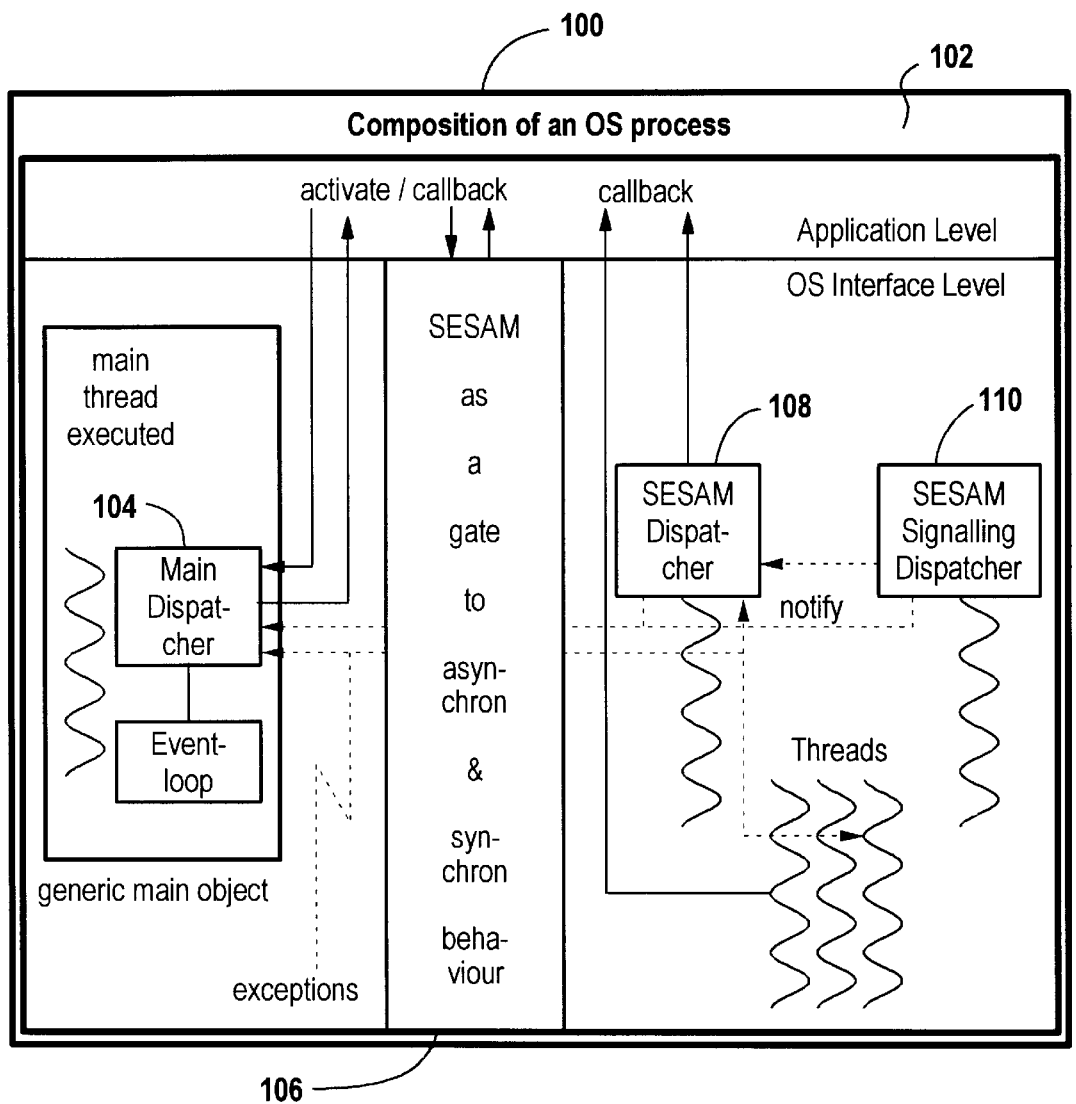
FIG. 4 illustrates an environment schematic for SESAM.

With reference to FIG. 4, it can be seen that within an operating process 100 an application programmer working at application level 102 registers services with a main dispatcher 104 upon process startup. However, whenever asynchrony is required within the registered services, the services can make use of SESAM 106. In that case, asynchronous callback scheduling will be serviced by a SESAM dispatcher 108. This includes all user callbacks registered to be executed asynchronously.

Because the main dispatcher 104 and SESAM dispatcher 108 both will execute user callback code that may block the main dispatcher 104, a third dispatcher, SESAM Signaling Dispatcher 110, is included and made responsible for ensuring that timer scheduling and communication events are not delayed by user code. User callbacks are registered with SESAM and it internally will notify the correct dispatchers to schedule the callbacks. System exceptions are handled on a low level within the main thread that in turn will notify the dispatchers or threads to execute the exception callbacks.

To understand the foregoing, SESAM functionality will be described.

HEURISTICS

Events always occur asynchronously. Depending on the semantics of the program, it is desirable to either be informed asynchronously (via registered callbacks) or synchronously (by explicitly querying as to whether or not an event has occurred). Another important object is synchronization to asynchronously incoming events (i.e., events coming in asynchronously), i.e, the programmer wants to do some processing and at a certain point in time he wants to be blocked until the next event or a logical combination of events occurs.

FUNCTIONALITY

SESAM is intended to support ASYNC-ASYNC programming models as well as ASYNC-SYNC programming models. ASYNC-ASYNC programming models are preferred if asynchronous events should be promoted to registered consumers asynchronously (push mode, supplier triggered). ASYNC-SYNC programming models are preferred if the consumer decides at what time an event should be triggered (consumer driven, pull mode).

SESAM is designed to offer a homogenous and comfortable interface to the following functions:
  execution of functions asynchronously (i.e. execution of a function in a separate thread) (Asynchronous Function Manager=AFM)
  scheduling of synchronous timers
  scheduling of asynchronous timers
  handling of exceptions
  providing general synchronization interface for communication events
  waiting for a list of events
  synchronizing with multiple dispatchers Each of the above mentioned features make internal use of "slots". Slots in SESAM are administrative entities that keep track of the state or status of activities assigned to the slots. These slots are tailored for special purposes (not visible to the user) and are identified by synchronization handles which are visible to the user and referred to as SynchHandles. These SynchHandles offer a homogenous view to the features supplied by SESAM. The lifecycle of SynchHandles is bound to the lifecycle of the SESAM object.

For debugging and/or support purposes, it is possible to give each slot a name (not checked for uniqueness). That way, important information can be retrieved about a slot at runtime (e.g. type, name, state, etc.).

Functions that are submitted to SESAM for invocation may depend on special thread specific data settings. But because SESAM provides an execution agent (for threads) for internal function invocation, hooks are provided allowing the application programmer to set and save thread specific data before and after function invocation. Hooks can be specified by the application programmer upon invocation of selected SESAM API functions using a HookInfo structure. The HookInfo structure allows the specification of four functions along with parameters for each of the functions.

FIG. 5 shows the basic components of SESAM. Attached as an Appendix hereto is the header file of the C++ class CsaSESAM which implements the components described herein. Reference should also be made to the commonly assigned copending applications incorporated herein by reference for further information regarding other items used by SESAM such as the classes CsaConnectable and CsaRemote, among others. In particular, reference should be made to application Ser. No. 08/676,859, Attorney Docket No. P96,0462.

As illustrated, SESAM contains 5 different types of slots, each type tailored to its specific purpose:
  Dynamic slots 200 handle asynchrony for the application programmer,
  Timer slots 202 (synchronous), handle synchronous timers,
  Timer slots 204 (asynchronous), handle asynchronous timers,
  Exception slots 206 handle user defined system exception callbacks and
  Generic Slots, offering the comfort of waitFor . . . ( ) functionality for user events, i.e., external event notification.

Slots eventually have to make use of threads and schedule callbacks according to a user selected invocation mode. Therefore, a thread manager 210 provides a thread factory and the several dispatchers 104, 108 and 110 as discussed above, are responsible to invoke the callbacks with the correct scheduling. With respect to the main dispatcher 104, as illustrated, SESAM provides a pointer 104A thereto as the main dispatcher 104 is not a part of SESAM, per se.

SynchHandles identify activities within SESAM regardless of the slot type to which they are assigned. Since all activities serviced by SESAM are referenced through SynchHandles, a homogenous view to different slots and activities is provided. Internally slots are sequentially numbered at creation time. Especially because slots are re-usable (i.e. if they have finished an activity, they are then able to start processing the next request), a mapping between the actual SynchHandle and the internal slot identification (ID) processing this activity is required. This is the task of a slot administrator 212.

A pool of message blocks allows the usage of an efficient internal message passing mechanism. Message blocks can also be re-used. Available message blocks are kept in a message block reservoir 214.

Using SynchHandles in the waitFor . . . ( ) interface from activities that were e.g. removed or that were not successfully finished, results in an error. To, on the one hand, allow the re-usability of slots that were assigned to such failing activities, and, on the other hand, to not lose the history for such a SynchHandle, a list 216 of "invalid" SynchHandles thus is stored within SESAM.

Finally, there is an administrator 218 for threads currently blocked in a waitFor . . . ( ) call. This administrator 218 is responsible for unblocking a thread if the condition is true for which the thread was waiting.

ASYNCHRONOUS EXECUTION OF USER FUNCTIONS: THE AFM

SESAM provides concurrency mechanisms to the application programmer. This allows programmers to execute functions in parallel, i.e. these functions are executed asynchronously with respect to each other (e.g. in order to make efficient parallel use of several processing units).

Dynamic slots are used within SESAM to implement asynchrony.

The user specified function will be invoked in a thread asynchronously to the thread that has submitted this function. The execution state is monitored automatically and can be queried at any time. Synchronization on the termination of asynchronously executed functions is provided as well as the activation of user defined callbacks upon termination of asynchronous functions. The callback can be invoked synchronously from the main dispatcher 104 or asynchronously from the SESAM dispatcher 108 or a separate thread.

Arguments can be supplied to the user defined function. The return value of the user defined function is automatically supplied as an argument to the callback. The callback cannot return a value.

Figure 6:
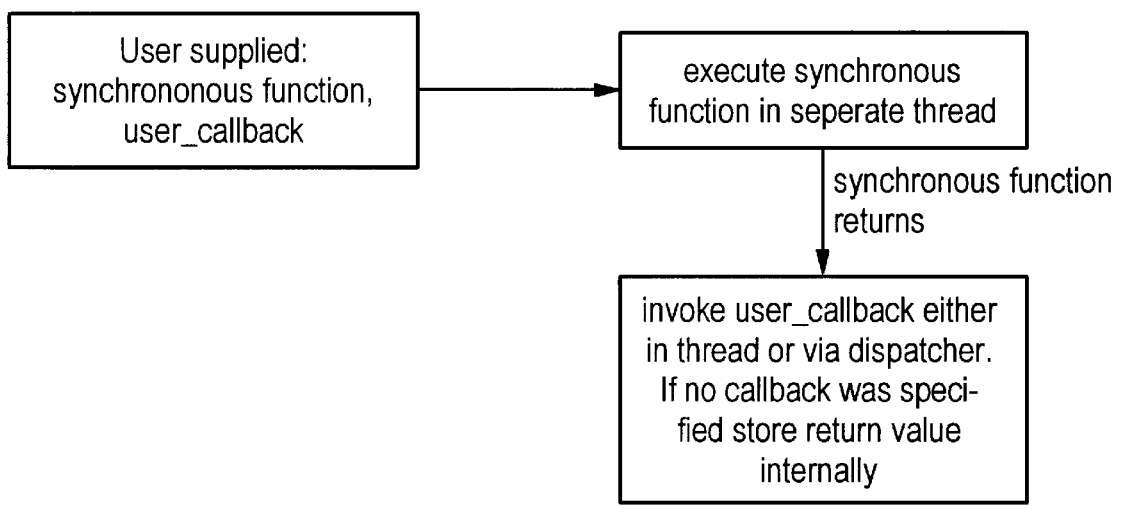
FIG. 6 illustrates principles of executing a user fiuction asynchronously.

FIG. 6 illustrates a basic principle of executing a user function asynchronously.

As illustrated, a user supplied synchronous function from a main thread is supplied with a user-callback request to be executed in a separate thread, i.e., the synchronous function will be executed asynchronously to the main thread.

When the asynchronous execution of the synchronous function is finished, the user specified callback function is invoked. The return value of the synchronous function is passed to the callback as an argument.

The thread of control in which the callback should be executed must be selected prior to invocation. Choices for such control are:

Main dispatcher thread

SESAM dispatcher thread asynchronous thread that has already executed the synchronous call.

Though the callback mechanism seems to be a reasonable way to process the return value of the asynchronously executed function, sometimes there are reasons to process the results at a latter point in time (synchronously in control flow). For example, if the user did not specify a callback, the return value of the asynchronously executed function can be stored internally until explicitly queried by the user.

STATES AND TRANSITION OF A DYNAMIC SLOT

When querying the status of a dynamic slot the below listed states can be returned:

Initial—non-signaled, slot is in an initial state and not yet used.

Started—non-signaled, slot is in use, the thread has started to execute the user function.

Finished—signaled, slot is in use, the user function is finished.

CbActive—signaled, slot is in use, callback function is running.

Idle—signaled, slot is unused, can be reused again.

Figure 7:
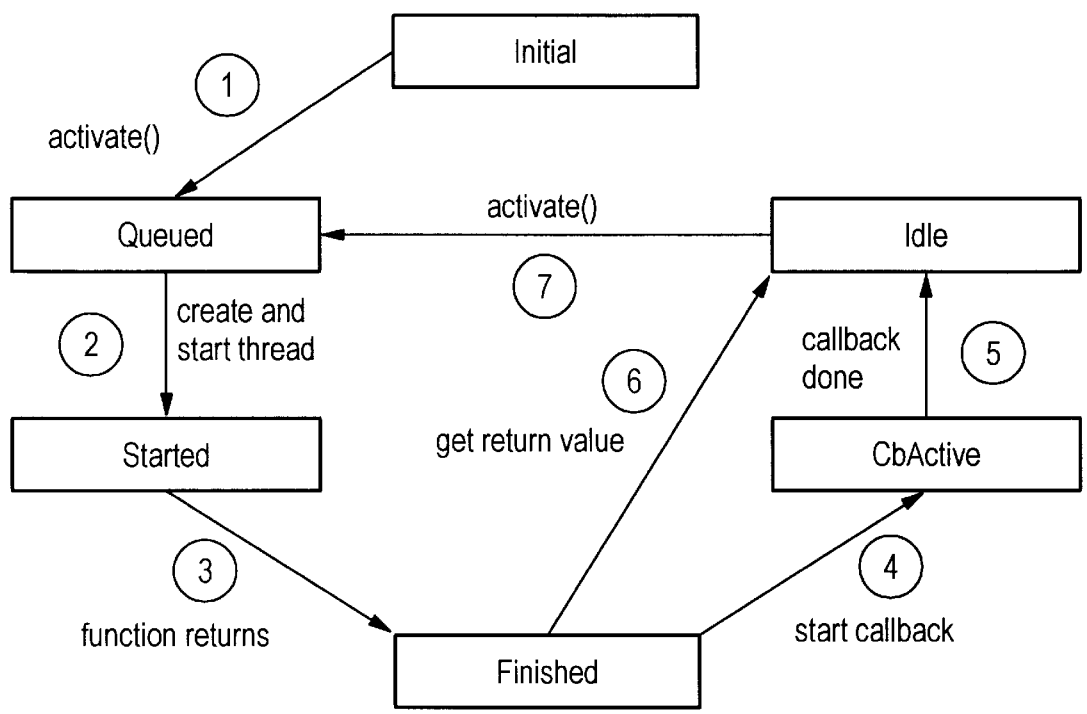
FIG. 7 illustrates transition states for a dynamic slot.

FIG. 7 shows state transitions for a dynamic slot. In FIG. 7, the encircled number corresponds to state transitions referred to next in parentheses.

As illustrated, upon creation, a slot is in an "Initial" state 300 (indicating that it was never used before and all it's members contain invalid values). If a function with argument and callback is submitted via the "activate( )" interface to SESAM, the slot will enter the "Queued" state 302, i.e., undergo state transition (1). After the worker thread is created and has started execution of the user function, the slot assumes a "Started" state 304, i.e, it undergoes state transition (2). When the user function returns, the slot enters a "Finished" state 306, i.e., it undergoes state transition (3).

Thereafter, when callback is activated, the slot state will turn to a "CbActive" state 308, i.e., it undergoes state transition (4). As soon as the callback returns, the slot reaches an "Idle" state 310, i.e., it undergoes state transition (5). With a new activation, the slot again will enter the "Queued" state 302, i.e., it undergoes state transition (1).

The illustrated state transition (6) from the "Finished" state 306 to the "Idle" state 310 is triggered when the user has not specified a callback function and has specified that the return value of the user function should be kept in the dynamic slot. The slot remains in the "Finished" state 306 until the return value for this dynamic slot is explicitly queried by the user. After a first query, the slot state changes to the "Idle" state 310. If the user does not specify a callback and does not want to keep the return value of the user function, then the transition (6) is performed automatically as soon as the slot has reached the "Finished" state 306.

Figure 8:
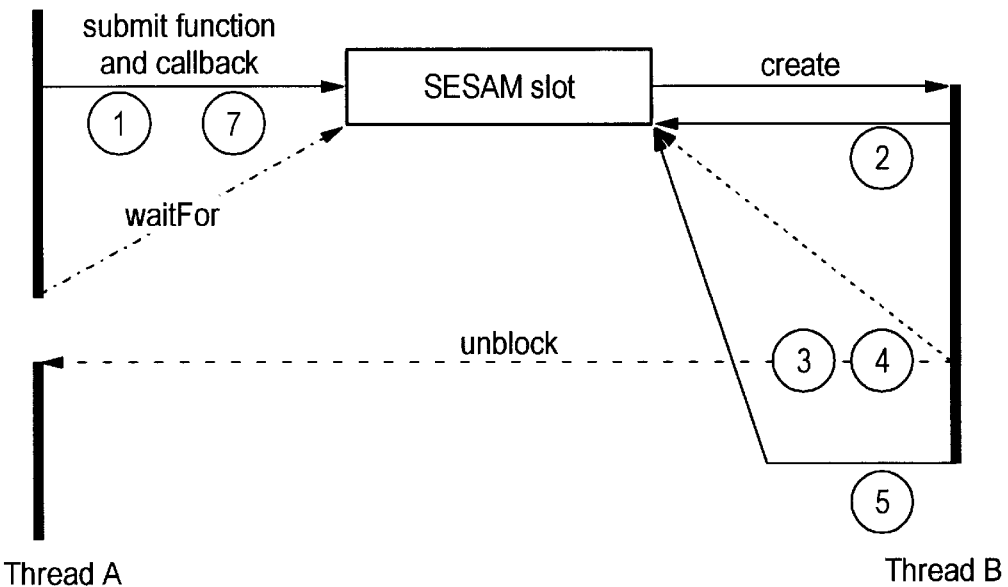
FIG. 8 illustrates asynchronous execution of a function with a callback mode.

FIG. 8 shows execution of a function asynchronously with callback mode CB_ASYNC$_{MD}$_ASYNC_AD.

The circled numbers correspond to the numbers in parenthesis in the next paragraph and to the circled numbers in the state transition diagram for SESAM's status register states.

As shown in FIG. 8, when a Thread A submits a function and a callback to SESAM, i.e., transistors (1,7) are to occur, internally SESAM needs a dynamic slot to satisfy this request. If no dynamic slot exists or is available then implicitly a new dynamic slot is created. When a function is submitted to a dynamic slot, a new thread is created (hidden from the user) that will start executing the submitted function, i.e., undergo transition (2). When the user function has returned, the slot state will change automatically to a "Finished" state, i.e., undergo transition (3). If a callback was specified, it is executed next, i.e., transition (4) occurs. The callback may either be executed in the same thread as the user function (as shown) or it is scheduled with the dispatcher to be run next in the dispatcher thread (not shown). When the callback is over, the slot status is again changed to "Idle," i.e., transition (5) takes place. All slot status changes are done implicitly (hidden from the user). With submission of a function, the dynamic slot is in a non-signaled state. At the end of the execution of the user function, the dynamic slot is automatically set to a signaled state (releasing threads that have been waiting for this slot to be in the signaled state, e.g. thread A).

Callback Invocation Mode

If a callback is specified, one out of three callback invocation modes must be selected. These modes are shown in Table 1.

lost. Afterwards the dynamic slot is automatically removed as if the notification would have been done. If callback is already active then the setting of suspend flag will be ignored.

If callback is already finished, then the respective dynamic slot does not exist any longer and suspend returns an error.

callback mode CbAsyncMainDispatch_ AsyncSesamDispatch is invoked and

Since the thread exists for the complete execution time of user function as well as callback function the thread will be always suspended resulting in either suspending user function or suspending callback. In this case notification does not get lost.

KeepRetVal or DismissRetVal is invoked and:

As long as the asynchronous thread exists, suspend will do a thread suspend.

If mode DismissRetVal was specified the slot will not exist longer as the thread exists and therefore trying to suspend the slot will return an error. If mode KeepRetVal was specified and the thread does not exist any longer a suspend flag will be set in the

TABLE 1

Callback invocation modes.

|  | CbSyncMainDispatch | CbAsyncMainDispatch_-SyncSesamDispatch | CbAsyncMainDisPatch_-AsyncSesamDispatch |
|---|---|---|---|
| Dynamic behavior | Callback will be invoked by the main dispatcher synchronously | Callback will be invoked by internal SESAM dispatcher. This is asynchronous to the main dispatcher, i.e. callback is invoked in parallel to callbacks that were registered with the main dispatcher. | Callback is invoked in the same thread as the user function. |
| Special features | Used if notification is not time critical and no other main dispatching should be done in parallel (e.g. if callback is not thread-safe). | Since all callbacks registered with this mode are invoked by the same dispatcher, they cannot be executed in parallel but are executed in series (e.g. if callback is not thread-safe this is useful). But parallelism to the main dispatcher is given. | The most accurate notification mechanism with minimum delay between end of function and callback invocation, i.e. offers the maximum degree of parallelism. |
| Special Notes | Can be destroyed by other callbacks for a long time. If callback uses blocking calls it will delay the execution of any other callback invoked by main dispatcher. | Can be delayed by any other callback registered with this mode or delay any other callback with this mode if using blocking calls. | Concurrency situations can occur. |

Control Interface

Dynamic slots can be suspended, resumed and removed. The effect on the execution depends on the callback invocation mode and point in time when the command was issued.

Dynamic slots are suspended when:
callback mode CbSyncMainDispatch or
CbAsyncMainDispatch_SyncSesamDispatch is invoked and
As long as the asynchronous thread exists, suspend will do a thread suspend.
If the thread no longer exists, a suspend flag will be set in the dynamic slot. If the callback is scheduled to run by the dispatcher and the suspend flag is set, callback invocation is skipped, i.e. the notification is dynamic slot (if still existing). When a programmer tries to retrieve the return value of a suspended slot he will receive an error message. Retrieval of return value is only possible if slot is not suspended.

Dynamic slots will be resumed if:
The thread was suspended.
The slot still exists, then the suspend flag will be reset.
The slot does not exist, Resume will then return an error code.

Dynamic slots will be removed when:
callback mode CbSyncMainDispatch or
CbAsyncMainDispatch_SyncSesamDispatch is invoked and:
As long as the asynchronous thread exists, the thread will be killed and the according event handler has to be removed from the dispatcher.

If thread does not exist any longer a remove flag will be set in the dynamic slot. If the callback is scheduled to run by the dispatcher and the remove flag is set, callback invocation is skipped, i.e. the notification is lost. Afterwards the dynamic slot is automatically removed as if the notification would have been done. If callback is already active then the setting of remove flag will be ignored.

If callback is already finished then the according dynamic slot does not exist any longer and remove returns an error.

callback mode CbAsyncMainDispatch_AsyncSesamDispatch:

Since the thread exists for the complete execution time of user function as well as callback function the thread will be always killed resulting in either killing the user function or killing the callback.

KeepRetVal, DismissRetVal:

As long as the asynchronous thread exists, remove will do a thread kill.

If thread does not exist and slot still exists, remove will free the slot. If slot does not exist any more remove will return an error.

Remove will abort an action at any point without taking care about semantics, i.e. incomplete transactions may occur.

Signaled State

A dynamic slot will be in a signaled state whenever the user function has returned within the asynchronous thread. A signaled state cannot be reset and changed by suspending/removing the slot afterwards. Using the SynchHandle of a dynamic slot that has been removed before the asynchronous function has been finished within a waitFor . . . ( ) call will result in an error. Using SynchHandle of a dynamic slot that has been removed after the asynchronous fumction has been finished in a waitFor . . . ( ) call will work normally. Any waitFor . . . ( ) calls that are waiting for the completion of an asynchronous function in any logical combination will be aborted and return an error at that moment when the according dynamic slot is removed.

The "activate( )" interface allows the specification of hooks to be invoked before the user function "beforeFunc" is invoked, after the user function "afterFunc" has returned, before the callback "beforeCb" is activated, and after the callback "afterCb" has returned. Functions "beforeCb" and "afterCb" are only invoked if a callback was specified.

The functions "beforeFunc" and "afterFunc" are invoked in the same thread as the function itself. The functions "beforeCb" and "afterCb" are invoked in the context of the thread that will execute the callback function itself.

SCHEDULING TIMERS

Timers are used to start an activity after a specified time delay. Such an activity is most often the invocation of a user specified function. The user function is scheduled to run after the timer has expired. Timer slots 202 and 204 (FIG. 5) are used within SESAM to support timer controlled activities.

SESAM supports two modes of scheduling timers (i.e. scheduling user functions): synchronously and asynchronously.

With respect to synchronous scheduling of timers, after the timer has expired, the main dispatcher 104 is informed to execute the user function as soon as possible. This may take a while if the dispatcher 104 is still executing another user function. If several timers were scheduled to expire at the same time the registered user functions are executed sequentially resulting in an increasing delay to the original desired point in time where the function was intended to run.

With respect to asynchronous scheduling of timers, after the timer has expired, the SESAM dispatcher 108 is informed to execute the user function as soon as possible. This may take a while if the dispatcher 108 is still executing another asynchronously registered callback function. If several asynchronous timers were scheduled to expire at the same time the registered user functions are executed sequentially resulting in an increasing delay to the original desired point in time where the function was intended to run. But asynchronous timer callbacks will be executed asynchronously to functions that are executed in the main thread.

Figure 9:
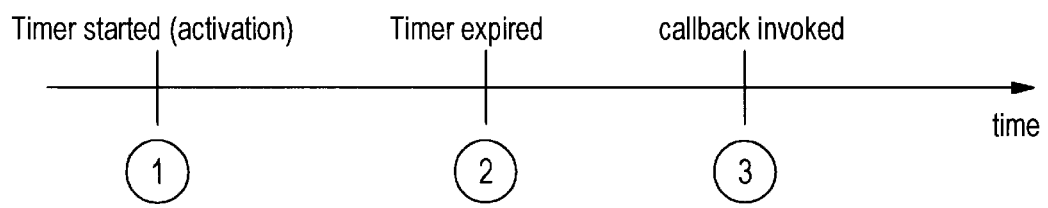
FIG. 9 illustrates a sequence of activities related to one shot timers.

FIG. 9 illustrates a sequence of activities related to one shot timers. As illustrated:

(1) A timer will be instantiated by supplying a time after which it should expire and a callback function to be invoked upon timer expiration.

(2) Thereafter, when the timer expires, it notifies the specified dispatcher to invoke the callback.

(3) Then the callback will be invoked by the dispatcher. The delay between expiration (2) of timer and invocation (3) of callback depends on how busy the dispatcher is with invoking other callbacks.

When specifying an interval timer two values must be supplied:

a delay value: the time after which the timer expires for the first time after activation.

an interval value: this time value will be the delta time between two succeeding timer expirations.

Figure 10:
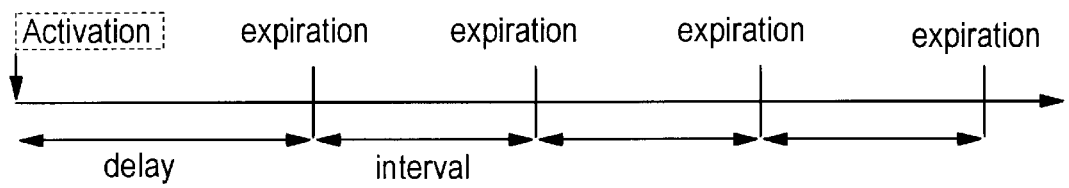
FIG. 10 illustrates a sequence of activities related to interval timers.

FIG. 10 illustrates a sequence of activities related to interval timers. As illustrated, if an interval timer expires before the according callback is invoked, the expiration events will be queued internally.

Figure 11:
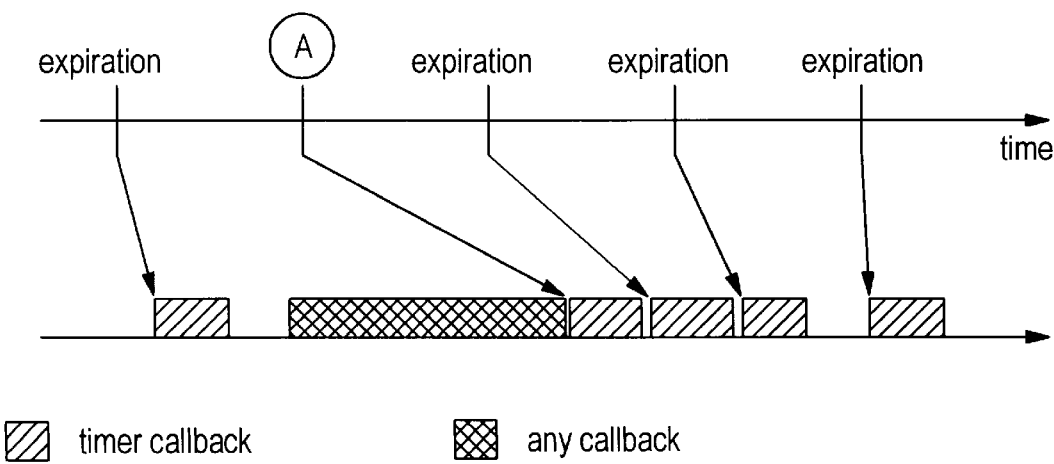
FIG. 11 illustrates a timer callback invocation delay due to invocation of another callback.

FIG. 11 illustrates a scenario where a timer callback that was triggered at a point in time (A) cannot be invoked due to a busy dispatcher. Before the callback is invoked the timer expires a second time and only then is the dispatcher able to start the callback. But the number of timer expirations and invoked callbacks is identical again.

Control Interface

In SESAM it is possible to suspend, resume and remove timer slots. Suspending a timer slot will result in suppressing the invocation of a callback at that time. Suspending a timer slot will not change its signaled state behavior. Resuming a timer slot will result in enabling the callback invocation again. Removing a timer slot will delete the timer slot within SESAM. If a timer slot is removed, its SynchHandle will be invalid for waitFor . . . ( ) invocations in which case an error will be returned.

Figure 12:
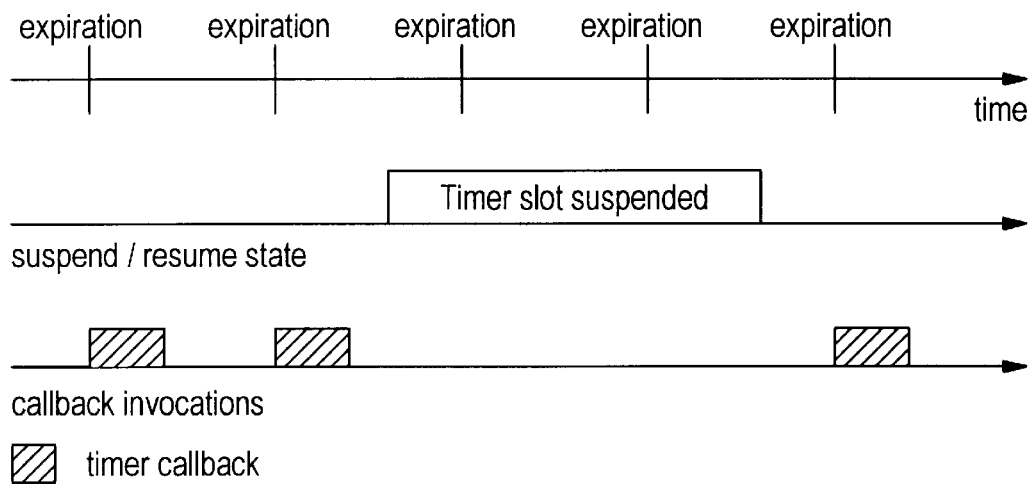
FIG. 12 illustrates suspension of a timer slot.
Figure 13:
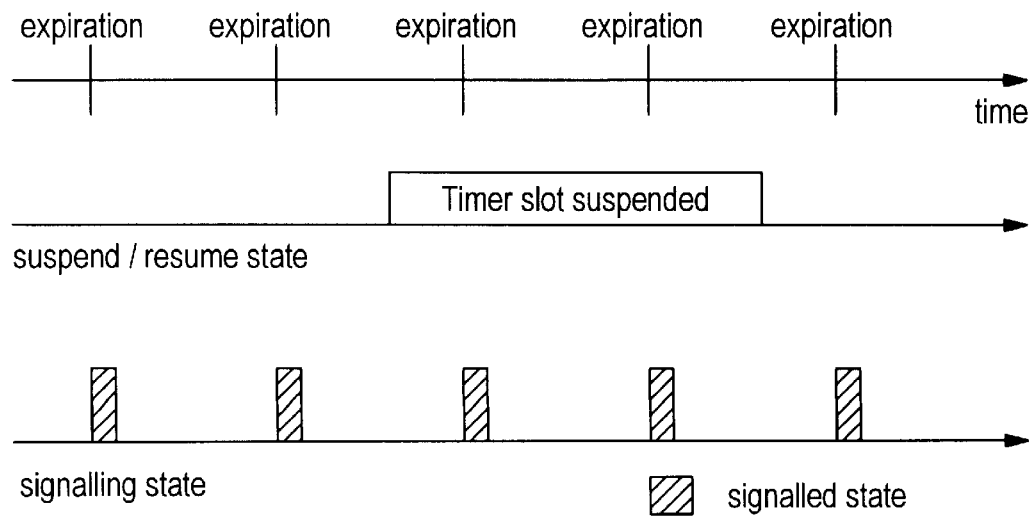
FIG. 13 illustrates a signaling state of a interval timer slot.

FIGS. 12 and 13 illustrate the effects of suspending of a timer slot. FIG. 12 illustrates the foregoing suppression of a callback. FIG. 13 illustrates the signaling state of an interval timer slot.

Signaled State

If the timer is a one shot timer, its slot will be in a signaled state after the timer has expired (regardless whether the timer is suspended at that time or not), and this state can not be reset. If the timer is an interval timer, the signaled state is only pulsed at every expiration time (regardless whether the time is suspended at that time or not). If a timer is removed, its slot state is invalid, i.e. it can't be used in a waitFor . . . ( ) call any more. Any waitFor . . . ( ) calls that are waiting for a timer event in any logical combination will be aborted and return an error at that moment when the appertaining timer slot is removed.

An "addTimer( )" interface allows the specification of hooks to be invoked before the timer callback is activated (beforeCb component) and after the timer callback has returned (afterCb component). These hook functions are invoked in the same thread in which the timer callback is invoked.

HANDLING SYSTEM EXCEPTIONS

If a process hangs completely at the user level (e.g., it is hung up in an endless loop) it may be desirable to issue to this process a high priority message that the process cannot ignore. Such high priority messages are called exceptions. On UNIX systems, exceptions are implemented as signals. A programmer can register callbacks for such exceptions that are to be invoked when an exception occurs in order to be able to respond to the exception. Exception slots are used in SESAM to implement this feature.

To that end, the main thread is configured to always receive the system exceptions (signals). A default exception handler will be started upon reception of an exception. This default handler is responsible for invoking all registered callbacks according to the selected invocation mode. Supported invocation modes for callbacks are identical to those for the dynamic slots (i.e., CBSyncMainDispatch, CbAsyncMainDispatch_SyncSesamDispatch, CbAsyncMainDispatch_AsyncSesamDispatch).

For each supported exception a well known unique SynchHandle exists. It is possible to either register callbacks with different invocation modes (like those for callbacks to dynamic slots) to an exception or to explicitly wait for the next exception. The notification mechanisms also are identical to those used for the dynamic slots. Since system exceptions in UNIX are implemented using signals some facts have to be considered:

- physically, the system only knows one exception handler per exception (not a stack of handlers). SESAM provides a separate stack of exception handlers for each invocation mode. But, any third party library may install its own exception handler with the system forgetting about the previously installed SESAM exception handler. This can lead to lost exceptions for SESAM registered callbacks. To avoid such a non-cooperative behavior, a re-install method is provided by SESAM that allows the chaining of third party handlers along with their own callback routines upon invocation.
- at installation time of a signal handler, it must be defined what happens with system calls that are interrupted by an exception signal, i.e, whether they should return an error (notifying the user about the interrupt) or they should be internally restarted. Conflicting settings of third party library handlers cannot be solved, i.e., if one library depends on the interrupt of system calls and the other does not (within the same process) either the first library component may hang (since it never left the system call, if restart was selected as desired by the second library) or the second library will return errors (since it never expected to have system calls being interrupted, if no restart was selected as desired by the first library).
- Third party libraries may not uninstall signal handlers at runtime. Most probably they will uninstall their default signal handler.

Third party exception handlers that are found during installation of the default handler will be invoked on the signal handler level by the default handler. Exception handlers being registered with SESAM will not be invoked on the signal handler level, but on the user level in the selected invocation mode. For each exception up to three tasks can exist within SESAM:

- one task for taking care of CbSyncMainDispatch registered callbacks,
- one task for taking care of CbAsyncMainDispatch_SyncSesamDispatch registered callbacks,
- and one task for invoking CbAsyncMainispatch_AsyncSesamDispatch registered callbacks.

This results in keeping the stack of callbacks for identical invocation modes within one task and sequentially activating each callback. The default handler will only put one message into the message queue for each task.

Figure 14:
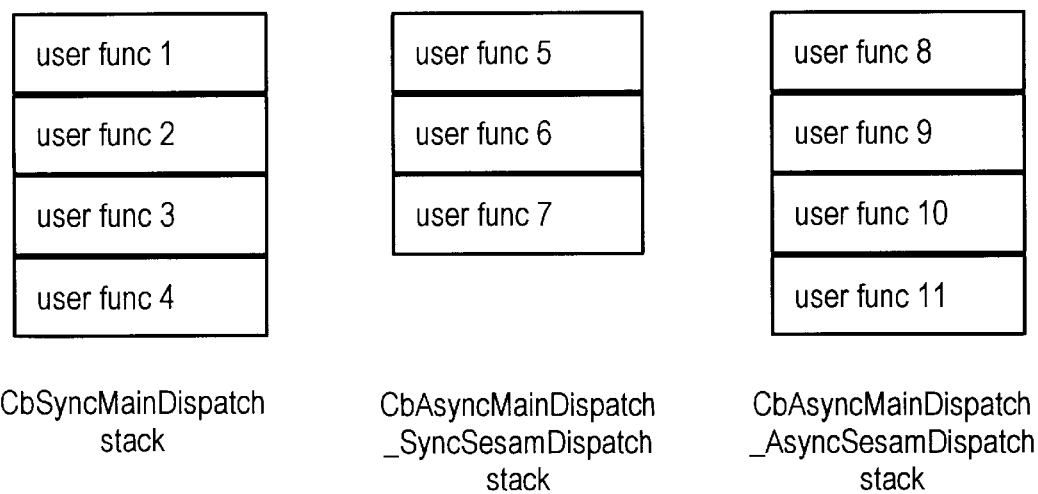
FIG. 14 illustrates a stack of user defined system exception handlers separated by invocation modes (within one slot, i.e., for one exception).

FIG. 14 illustrates a stack of user defined system exception handlers separated by invocation modes (within one slot, i.e. for one exception). As illustrated, exception handlers registered for the same exception in different invocation modes may run in parallel since they are located on different stacks.

Figure 15:
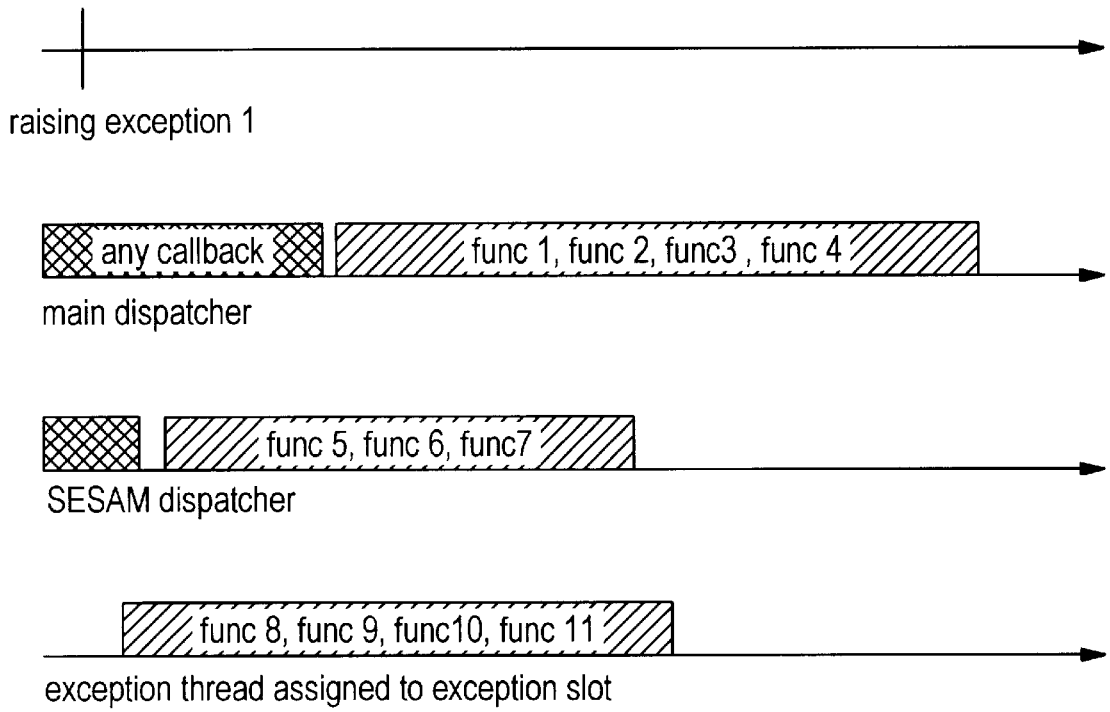
FIG. 15 illustrates parallel execution of exception handlers for the same exception.

FIG. 15 illustrates a parallel execution of exception handlers for the same exception. As illustrated, such a design also allows for the execution of exception handlers in parallel for different exceptions, if they are registered with using callback mode "CbAsyncMainDispatch_AsyncSesamDispatch." All other invocation modes enforce the sequential execution of callbacks (even for different exceptions).

Figure 16:
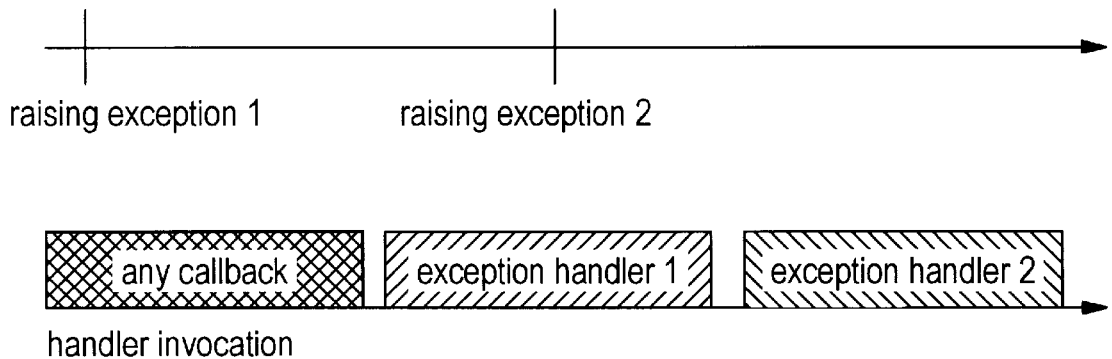
FIG. 16 illustrates the process of serializing exception handler routines by invoking them via a dispatcher (using callback modes CbSyncMainDispatch, CbAsyncMainDispatch_SyncSesamDisptach).

FIG. 16 illustrates serializing exception handler routines by invoking them via the dispatcher 104 (using callback modes CbSyncMainDispatch) or dispatcher 108 (using callback modes CbAsyncMainDispatch_SyncSesam)ispatch).

Figure 17:
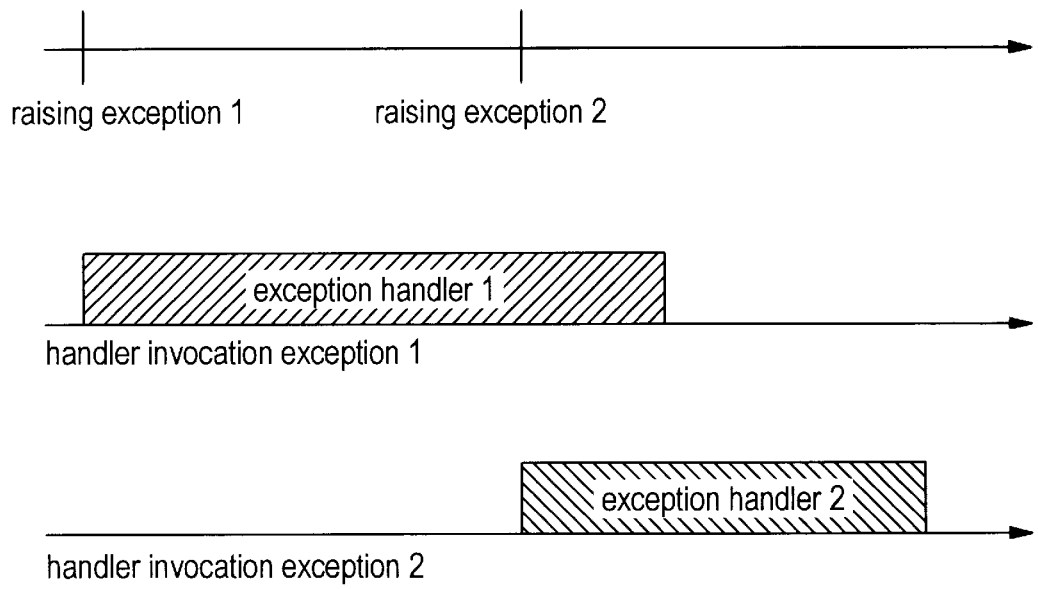
FIG. 17 illustrates parallel execution of exception handlers for different exceptions when using callback mode CbAsyncMainDispatch_AsyncSesamDispatch.

FIG. 17 illustrates parallel execution of exception handlers for different exceptions when using callback mode CbAsyncMainDispatch_AsyncSesamDispatch.

With each invocation of the default handler, the slot for the appertaining exception will be pulsed, i.e. set and reset.

Signaled State

Figure 18:
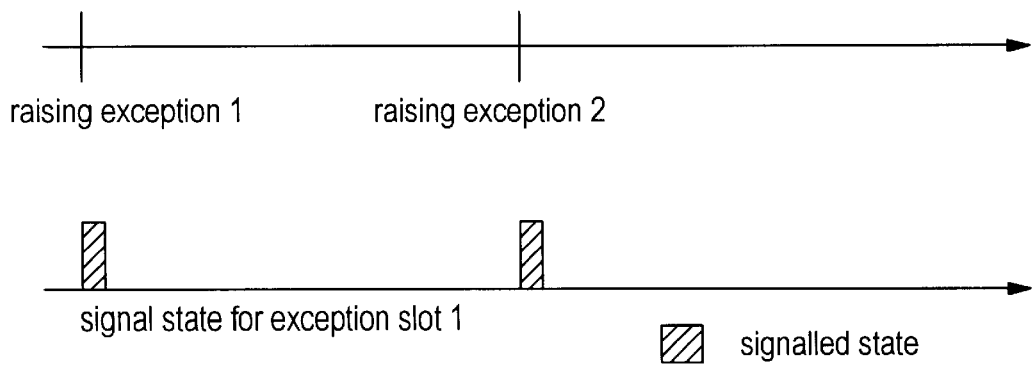
FIG. 18 illustrates a signaled stated of a exception slot.

FIG. 18 illustrates a signaled state of an exception slot. As illustrated, Synch Handles for exception slots are always valid, i.e. can always be used in waitFor . . . ( ) calls.

The default handler is responsible for detection, if invoked for the first time on signal level, or repeatedly invoked by cooperative signal handlers from third party libraries. If invoked repeatedly (i.e., an endless loop), the default handler just returns without executing further activities.

Upon installation of the default handler, already installed handlers of third party software must be chained along with all other registered callbacks and not discarded.

The installation mode of default handlers "SA_RESTART" and "SA_NORESTART" will depend on the installation mode of third party library handlers found upon installation time. Default handler should always be installed in the same mode as previously registered third party library handlers. Third party library handlers may not have conflicting installation modes.

Third party libraries may not uninstall signal handlers at runtime (since they most likely will uninstall the default handler).

Installation of a default signal handler for a specific signal is only needed if the first callback is registered to this signal (either explicitly by register( ) or implicitly by using waitFor . . ( )).

Message queue manipulations within the tasks for each exception must use signal guards in order to prevent deadlocks.

For safety purposes, within each thread that is active at the signal handler level, a thread specific storage entry is set to indicate execution at the signal handler level. This entry allows for checking within non-exception safe functions as to whether they are invoked correctly or not. If invoked at the exception level, they may return an error. Setting and resetting of this thread specific storage entry is the responsibility of appertaining handles . . . ( ) routines providing the environment for subsequently invocations of registered callbacks.

Upon entry into the default signal handler the thread specific error from the user level must be saved (to prevent an overwrite of the error) and restored before leaving the handler (so that the data is again available at the user level).

An exception handler is removed at the time the "remove" call is issued even if there are exceptions still pending for this handler.

The "registerExceptionHandler( )" interface allows the specification of hooks to be invoked before the exception callback is activated (beforeCb component) and after the exception callback has returned (afterCb component). The hook functions will be invoked in the same thread in which the exception callback is invoked.

GENERAL SYNCHRONIZATION INTERFACE

Synchronization on completion of parallel activities is an important issue (e.g. wait until either SynchHandle 1 or SynchHandle 2 is finished but not longer than a fixed amount of time). To relieve the application programmer from this error prone job, a generic slot concept is provided within SESAM that allows the usage of a homogenous waitFor . . . ( ) interface for all kinds of events.

Since event propagation within a software architecture, such as CSA, is implemented by means of objects or classes such as CsaConnectables and CsaRemotes, they internally use the generic slot interface of the SESAM in order to provide the user with the possibility of waiting for (i.e., synchronize on) any user events. CsaConnectables and CsaRemotes are internally connected with the underlying basic communication system ("bcs" which is invisible to the user). For more information on these objects/classes please refer to the commonly assigned and copending applications referred to above which are incorporated herein by reference.

A generic slot can be created, deleted, set to signaled state, reset from signaled state and pulsed (implicitly set/reset signaled state). Since a generic slot has a SynchHandle assigned to it, it can be waited for. This extends the application range of the waitFor . . . ( ) call to any user event.

A generic slot is interconnected to a combination of "CsaConnectable" (i.e. supplier of an user event) and bcs object or to a combination of bcs object and "CsaRemote" object (i.e. consumer of an user event).

Supplier Connection

A generic slot will be created by a bcs object every time a CsaConnectable registers with it. This generic slot is assigned to the newly registered CsaConnectable exclusively. The CsaConnectable can query the SynchHandle from its bcs, if needed.

Figure 19:
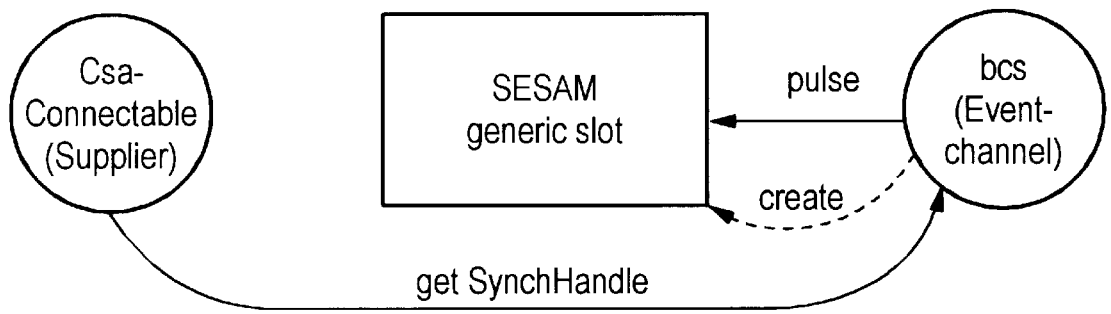
FIG. 19 illustrates interconnection between CsaConnectable a generic slot and bcs object.

FIG. 19 illustrates an interconnection between a CsaConnectable, a generic slot and a bcs object. As illustrated, the generic slot assigned to a CsaConnectable will be pulsed whenever a reply for this CsaConnectable is received. waitFor . . . ( ) on the SynchHandle for a CsaConnectable allows to wait for any reply coming into this CsaConnectable.

The creation of generic slots for CsaRemotes and CsaConnectables upon registration can be enabled/disabled at the bcs object during process startup.

Consumer Connection

A generic slot will also be created by a bcs object every time a CsaRemote registers with it. This generic slot is assigned to the newly registered CsaRemote exclusively. The CsaRemote object can query the SynchHandle from its bcs, if needed.

Figure 20:
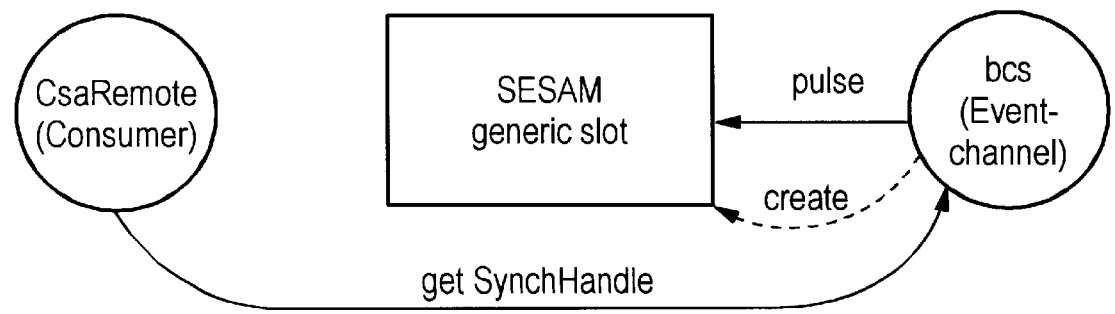
FIG. 20 illustrates interconnection between CsaRemote, a generic slot and bcs object.

FIG. 20 illustrates a Interconnection between a CsaRemote object, a generic slot and a bcs object. As illustrated, a generic slot assigned to a CsaRemote object will be pulsed whenever an update was received by the CsaRemote (push mode) or whenever any getvalueo call succeeded with this CsaRemote (pull mode).

The creation of generic slots for CsaRemotes and CsaConnectables upon registration can be enabled/disabled at the bcs object during process startup.

Control Interface

There is no support for suspend/resume methods on generic slots.

Signaled State

With each reply being received by the bcs object and transferred to the CsaConnectable, the generic slot is pulsed.

Figure 21:
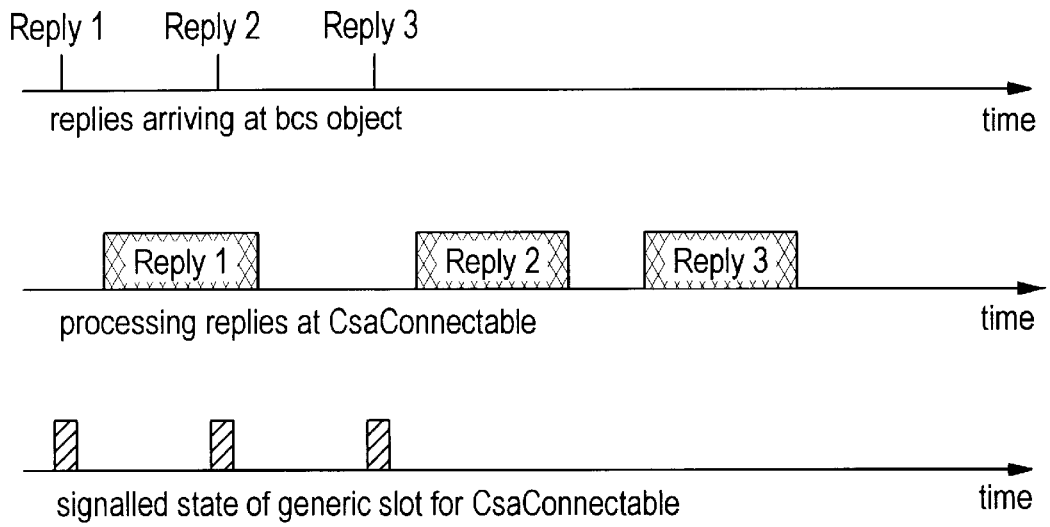
FIG. 21 illustrates the signaled state of a CsaConnectable.

FIG. 21 illustrates a signalled state of a CsaConnectable.

For the CsaRemote slot signaling will depend on the operation mode (Push/Pull):

Pull Mode:
    The bcs object will pulse the generic slot for a CsaRemote in pull mode whenever a getvalue( ) call succeeded for this CsaRemote object.

Figure 22:
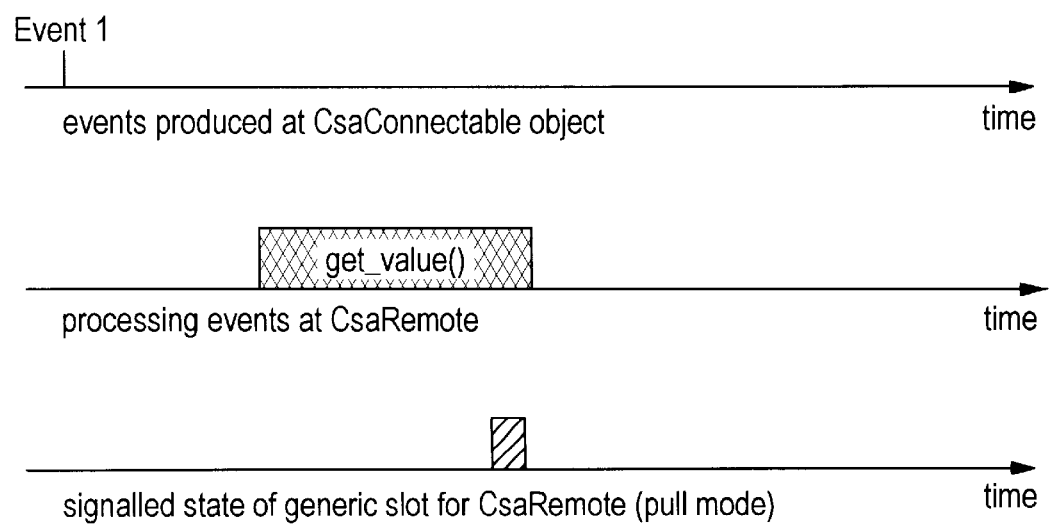
FIG. 22 illustrates the signaled state of a CsaRemote in pull mode.

FIG. 22 illustrates a Signaled state of a CsaRemote in Pull mode.

Push Mode:
    The bcs object will pulse the generic slot (set/reset) with each event (update) being received for this CsaRemote before the callback is activated.

Figure 23:
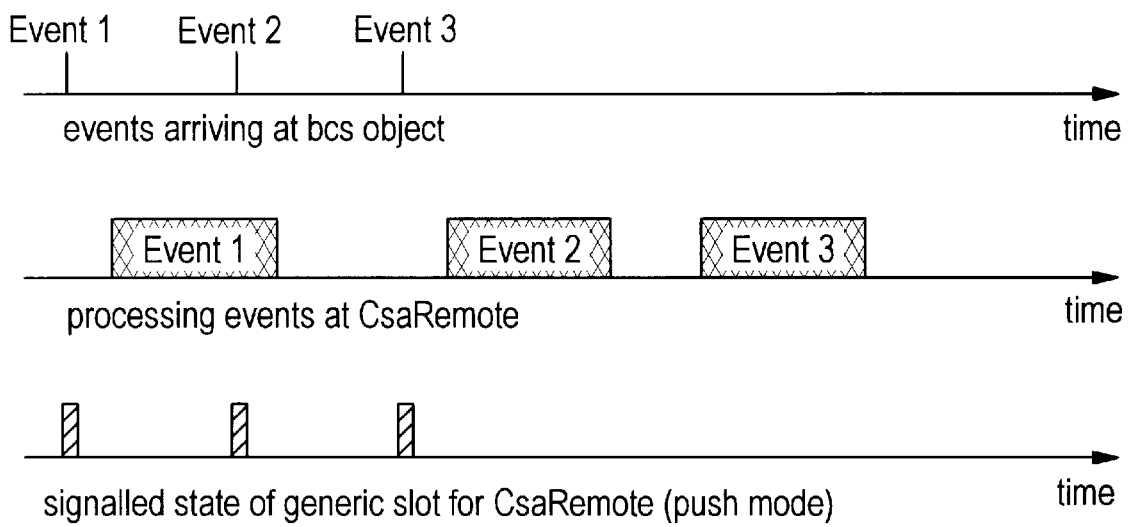
FIG. 23 illustrates the signaled state of a CsaRemote in push mode.

FIG. 23 illustrates a Signaled state of a CsaRemote in Push mode.

If a CsaConnectable/CsaRemote is destroyed, its generic slot state is invalid, i.e. it can't be used in a waitFor . . . ( ) call any more in future. Any waitFor . . . ( ) calls that are waiting for an event in any logical combination will be aborted and return an error at that moment when the according CsaConnectable/CsaRemote is removed.

Hooks

No hooks are provided for generic slots.

Although modifications and changes may be suggested by those skilled in the art, it is the intention of the inventors to embody within the patent warranted hereon all changes and modifications as reasonably and properly come within the scope of their contribution to the art.

APPENDIX

TO
U.S. PATENT APPLICATION
OF
KARLHEINZ DORN, et al.
ENTITLED
"SERVICE AND EVENT
SYNCHRONOUS/ASYNCHRONOUS MANAGER"
(ATTORNEY DOCKET NO. P96,0461)

```
class CsaSesam
{
    public:
        typedef unsigned long    SynchHandleType;
        struct HookInfo
        {
            void (*beforeFunc) (void*);
            void *arg1;
            void (*afterFunc) (void*);
            void *arg2;
            void (*beforeCb) (void*);
            void *arg3;
            void (*afterCb) (void*);
            void *arg4;
        };
        enum DynSlotStateType
                { Initial = 256,
                  Queued,
                  Started,
                  Finished,
                  CbActive,
                  Idle
                };
        struct SlotInfo
        {
            char              myIdString[20];
            DynSlotStateType  mySlotState;
            char              myCntlState;
        };
        enum CbModeType
                { CbSyncMainDispatch = 256,
                  CbAsyncMainDispatch_SyncSesamDispatch,
                  CbAsyncMainDispatch_AsyncSesamDispatch
                };
        enum RetValModeType
                { KeepRetVal = 256,
                  DismissRetVal
                };
        enum LogicalCombinationType
                { LogAnd = 256,
                  LogOr
                };
        enum TimerModeType
                { TimerSync = 256,
                  TimerAsync
                };
        enum ExceptionNameType
                { Exception1 = 256,
                  Exception2
        static CsaSesam* sesam(void);
        bool info (const SynchHandleType& theSh,
                   SlotInfo& theInfo);
        bool suspend (const SynchHandleType& theSh);
        bool resume (const SynchHandleType& theSh);
        bool remove (const SynchHandleType& theSh);
        bool waitForMultipleObjects    (int theNum,
                                        const SynchHandleType *const theSh,
                                        LogicalCombinationType theCombMode,
                                        SynchHandleType *const theSSh = 0,
                                        unsigned long theTimeout = 0);
        bool activate    (void* (*const theFunc) (void*),
                          void *const theArg,
                          SynchHandleType& theSh,
                          void (*const theCb) (void*),
                          const char *const theName = "",
                          CbModeType = CbAsyncMainDispatch_SyncSesamDispatch,
                          const HookInfo *const theHooks = 0);
        bool activate    (void* (*const theFunc) (void*),
                          void *const theArg,
                          SynchHandleType& theSh,
```

APPENDIX-continued

TO
U.S. PATENT APPLICATION
OF
KARLHEINZ DORN, et al.
ENTITLED
"SERVICE AND EVENT
SYNCHRONOUS/ASYNCHRONOUS MANAGER"
(ATTORNEY DOCKET NO. P96,0461)

```
                         const char *const theName = "",
                         RetValModeType = DismissRetVal,
                         const HookInfo *const theHooks = 0);
    bool getRetVal  (const SynchHandleType& theSh,
                         void **const theRetVal);
    bool isCancelled (void);
    bool addTimer   (unsigned long theInterval,
                         unsigned long theDelay,
                         void (*const theCb) (void*),
                         void *const theArg,
                         TimerModeType theMode = TimerSync,
                         const char *const theName = "",
                         SynchHandleType *const theSh = 0,
                         const HookInfo *const theHooks = 0);
    bool registerExceptionHandler (ExceptionNameType theName,
                         void (*const theCb) (ExceptionNameType),
                         CbModeType theMode
                            = CbAsyncMainDispatch_SyncSesamDispatch,
                         const HookInfo *const theHooks = 0);
    bool remove     (ExceptionNameType theName,
                         void (*const theCb) (ExceptionNameType),
                         CbModeType theMode
                            = CbAsyncMainDispatch_SyncSesamDispatch);
    bool createGenericSlot (SynchHandleType& theSh,
                         const char *const theName = "");
    bool set (const SynchHandleType& theSh);
    bool reset (const SynchHandleType& theSh);
    bool pulse (const SynchHandleType& theSh);
    void dump (void);
protected:
    CsaSesam(ACE_Reactor *theMainDispatcher = ACE_Service_Config::reactor());
private:
    ~CsaSesam();
    void destroy (void);
    ACE_Thread_Manager              *myThreadManager;
    ACE_Thread_Manager              *myThreadManagerInternal;
    ACE_Map_Manager   <SynchHandleType,
                          CsaSesamSlot *,
                          ACE_Null_Mutex>   *myMapMgr;
    int                             myMapMgrSize;
    ACE_Reactor                     *myMainDispatcher;
    short                           myMainDispatcherFlag;
    int                             myDispatcherThrId;
    ACE_Reactor                     *mySesamDispatcher;
    int                             myDispatcherThrId1;
    ACE_Reactor                     *mySignalDispatcher;
    int                             myDispatcherThrId2;
    CsaSesamThrTermHandler          *myThrTermHandlerPtr;
    bool                            myInitFlag;
    ACE_RW_Mutex                    myRWLock;
    ACE_Message_Queue <ACE_MT_SYNCH>  myMQ;
```

We claim:

1. An object oriented computing system programmer interface system on a computer platform, comprising:

(a) at least one dynamic slot providing asynchronous execution of programmer submitted functions;

(b) at least one synchronous timer slot;

(c) at least one asynchronous timer slot;

(d) at least one exception slot for handling programmer defined system exception callbacks;

(e) at least one slot providing external event notification for programmer events;

(f) a SESAM dispatcher;

(g) a main dispatcher;

(h) a SESAM signaling dispatcher;

(i) message block memory for storage of message blocks;

(j) a list of activity identifiers that return an error when used in waitFor . . . ( ) calls; and (k) an administrator for mapping of the activity identifiers to slot identifiers.

2. The object oriented computing system programmer interface system of claim 1, wherein a plurality of dynamic slots are provided, and the dynamic slots are configured to assume the following states:

an initial state when nonsignalled and not yet used;

a queued state when nonsignalled and in use;

a started state when nonsignalled and in use and a submitted function is being executed;

a finished state when signalled and in use and execution of a submitted function is complete;

a callback active state when signalled and in use and a submitted function is being executed; and an idle state when signalled and no longer in use, wherein a signalled state is assumed when a programmer submitted function has been executed.

3. The object oriented computing system programmer interface system of claim 1, wherein the main dispatcher is provided by way of a pointer to an operating system dispatcher.

4. An object oriented computing system programmer interface system, comprising:

means for centrally dispatching callbacks and providing runtime configurable delivery of even callbacks;

means for suspending/resuming execution of event callbacks by the programmer through a SESAM application programmer interface;

means for blocking waits for events in event callbacks;

means for executing functions asynchronously with respect to events occurring external to the interface system; and means for executing asynchronous timer callbacks in parallel to other running event callbacks.

5. An object oriented computing system programmer interface system, comprising:

means for interrupting callback driven systems, including interrupting callbacks themselves;

an asynchronous dispatcher;

a synchronous dispatcher;

an asynchronous signaling dispatcher; and a plurality of different types of slots used for administering activities assigned to them, at least one slot administering asynchrony for programmer submitted functions.

6. The object oriented computing system programmer interface of claim 5 wherein said plurality of different types of slots comprises:

at least one dynamic slot which administrates asynchrony for an application programmer;

at least one synchronous timer slots which administrates synchronous timers;

at least one asynchronous timer slot which administrates asynchronous timers;

at least one exception slot which administrates user defined system exception callbacks; and at least one generic slot which administrates waitFor . . . ( ) functionality for user events.

7. A storage medium including object oriented code having an object oriented computing system programmer interface system on a computer platform, comprising:

(a) at least one dynamic slot providing asynchronous execution of programmer functions;

(b) at least one synchronous timer slot;

(c) at least one asynchronous timer slot;

(d) at least one exception slot for handling programmer defined system exception callbacks;

(e) at least one slot providing external event notification for programmer events;

(f) a SESAM dispatcher;

(g) a main dispatcher;

(h) a SESAM signaling dispatcher;

(i) message block memory for storage of message blocks;

(j) a list of activity identifiers that return an error when used in waitFor . . . ( ) calls; and (k) an administrator for mapping of the activity identifiers to slot identifiers.

8. The storage medium of claim 7, wherein a plurality of dynamic slots are provided, and the dynamic slots are configured to assume the following states:

an initial state when nonsignalled and not yet used;

a queued state when nonsignalled and in use;

a started state when nonsignalled and in use and a submitted function is being executed;

a finished state when signalled and in use and execution of a submitted function is complete;

a callback active state when signalled and in use and a submitted function is being executed; and an idle state when signalled and no longer in use, wherein a signalled state is assumed when a programmer submitted function has been executed.

9. The storage medium of claim 7, wherein the main dispatcher is provided by way of a pointer to an operating system dispatcher.

10. A storage medium including object oriented code having an object oriented computing system programmer interface system, comprising:

means for centrally dispatching callbacks and providing runtime configurable delivery of event callbacks;

means for suspending/resuming execution of event callbacks by the programmer through a SESAM API method;

means for blocking waits for events in event callbacks;

means for executing functions asynchronously with respect to events occurring external to the interface system; and means for executing asynchronous timer callbacks in parallel to other running event callbacks.

11. A storage medium including object oriented code having an object oriented computing system programmer interface system, comprising:

means for interrupting callback driven systems, including interrupting callbacks themselves;

an asynchronous dispatcher;

a synchronous dispatcher;

an asynchronous signaling dispatcher; and a plurality of different types of slots used for administering activities assigned to them, at least one slot which administering asynchrony for programmer submitted functions.

12. The storage medium of claim 11 wherein said plurality of different types of slots comprises:

at least one dynamic slot which administrates asynchrony for an application programmer;

at least one synchronous timer slots which administrates synchronous timers;

at least one asynchronous timer slot which administrates\asynchronous timers;

at least one exception slot which administrates user defined system exception callbacks; and at least one generic slot which administrates waitFor . . . ( ) functionality for user events.

* * * * *